(12) United States Patent
Maillard

(10) Patent No.: US 10,145,285 B2
(45) Date of Patent: Dec. 4, 2018

(54) METHOD AND APPARATUS FOR MONITORING FLUID REDUCTANT FOR INTERNAL COMBUSTION ENGINE EXHAUST

(71) Applicant: Jaguar Land Rover Limited, Coventry (GB)

(72) Inventor: David Maillard, Coventry (GB)

(73) Assignee: Jaguar Land Rover Limited, Coventry, Warwickshire (GB)

(*) Notice: Subject to any disclaimer, the term of this patent is extended or adjusted under 35 U.S.C. 154(b) by 421 days.

(21) Appl. No.: 14/899,644

(22) PCT Filed: Jun. 26, 2014

(86) PCT No.: PCT/EP2014/063511
§ 371 (c)(1),
(2) Date: Dec. 18, 2015

(87) PCT Pub. No.: WO2015/000783
PCT Pub. Date: Jan. 8, 2015

(65) Prior Publication Data
US 2016/0146080 A1    May 26, 2016

(30) Foreign Application Priority Data

Jul. 5, 2013   (GB) .................................. 1312105.8

(51) Int. Cl.
*F01N 3/20*      (2006.01)
*F01N 11/00*     (2006.01)

(52) U.S. Cl.
CPC .......... *F01N 3/208* (2013.01); *F01N 3/2066* (2013.01); *F01N 11/00* (2013.01);
(Continued)

(58) Field of Classification Search
CPC ........ F01N 3/2066; F01N 3/208; F01N 11/00; F01N 2550/02; F01N 2550/05;
(Continued)

(56) References Cited

U.S. PATENT DOCUMENTS

2005/0207936 A1   9/2005   Berryhill et al.
2009/0293451 A1   12/2009  Kesse
(Continued)

FOREIGN PATENT DOCUMENTS

DE   10 2006 055 235 A1   5/2008
EP       2 333 261 A1     6/2011
WO   WO 2012/052799 A1    4/2012

OTHER PUBLICATIONS

Combined Search and Examination Report, GB 1312105.8, dated Jan. 20, 2014, 5 pages.
(Continued)

*Primary Examiner* — Audrey K Bradley
(74) *Attorney, Agent, or Firm* — Myers Bigel, P.A.

(57) ABSTRACT

A method and means of determining the quality of a fluid reductant used in selective catalytic reduction to reduce NOx emissions from an internal combustion engine. Short and long term average of NOx conversion efficiency are compared with thresholds, in order to determine if failure of selective catalytic reduction is due to incorrect reductant, or to failure of the catalyst device.

20 Claims, 3 Drawing Sheets

(52) U.S. Cl.
CPC ...... *F01N 2550/02* (2013.01); *F01N 2550/05* (2013.01); *F01N 2560/026* (2013.01); *F01N 2570/14* (2013.01); *F01N 2610/02* (2013.01); *F01N 2900/1621* (2013.01); *Y02A 50/2325* (2018.01); *Y02A 50/2344* (2018.01); *Y02T 10/24* (2013.01); *Y02T 10/47* (2013.01)

(58) Field of Classification Search
CPC .......... F01N 2560/026; F01N 2570/14; F01N 2610/02; F01N 2900/1621; Y02A 50/2344; Y02A 50/2325; Y02T 10/24; Y02T 10/47
See application file for complete search history.

(56) References Cited

U.S. PATENT DOCUMENTS

2010/0031641 A1\* 2/2010 Oda .................. B01D 53/9431
60/286
2010/0083636 A1 4/2010 Wang et al.
2012/0280819 A1 11/2012 Kowalkowski et al.

OTHER PUBLICATIONS

Combined Search and Examination Report, GB 1411335.1, dated Jan. 6, 2015, 5 pages.
Notification of Transmittal of the International Search Report and the Written Opinion, PCT/EP2014/063511, dated Aug. 11, 2014, 15 pages.

\* cited by examiner

METHOD AND APPARATUS FOR MONITORING FLUID REDUCTANT FOR INTERNAL COMBUSTION ENGINE EXHAUST

RELATED APPLICATIONS

This application is a 35 U.S.C. § 371 national stage application of PCT Application No. PCT/EP2014/063511, filed on Jun. 26, 2014, which claims priority from Great Britain Patent Application No. 1312105.8 filed on Jul. 5, 2013, the contents of which are incorporated herein by reference in their entireties. The above-referenced PCT International Application was published in the English language as International Publication No. WO 2015/000783 A1 on Jan. 8, 2015.

TECHNICAL FIELD

This invention relates to a method and apparatus for an internal combustion engine and particularly, but not exclusively, to a method and apparatus for monitoring the quality of a fluid reductant used in the treatment of exhaust gases of internal combustion engines. Aspects of the invention relate to a method, to a system, to a module, to an engine, to a diagnostic, to a prognostic and to a vehicle.

BACKGROUND

Legislation requires that emissions of nitrous oxides (NOx) from vehicle engines be reduced. Selective catalytic reduction (SCR) has been proposed to treat the exhaust gas stream of such engines, particularly diesel engines. In SCR a reductant, such as ammonia or urea, is mixed with the exhaust gases upstream of a catalytic chamber. When the exhaust gases are within a prescribed temperature range a chemical reaction occurs in the catalytic chamber to convert the reductant/NOx mixture into nitrogen and water. NOx emissions from the tailpipe are thus reduced. Several kinds of reductant are available, and one sub-set is collectively termed Diesel Exhaust Fluid (DEF).

This specification refers frequently to diesel engines of vehicles; however the invention is applicable to all internal combustion engines requiring NOx treatment of the exhaust gases in an SCR device. Such engines may also have a non-vehicle application.

A fluid reductant, such as urea, is generally supplied as a liquid to be dispensed to the exhaust system from a supply tank. Periodically, and typically at an interval of 15-20,000 miles in a vehicle, the tank must be replenished, for which purpose an indicator of low level may be provided.

In order to ensure that a fluid reductant of the prescribed quality is added to the supply tank, the efficiency of SCR conversion is monitored. Such monitoring is necessary not only to ensure continuing compliance with a legislative limit, but also to ensure that the engine performs as intended without generating indirect malfunction indications.

Vehicle legislation typically requires an on-board diagnostic (OBD) to test for correct operation of the SCR device, thereby to ensure that the emissions from the exhaust tailpipe remain within the legislative limit over time. Failure of the SCR device can thus be detected and signalled to the vehicle driver.

In a conventional vehicle OBD, the NOx content upstream of the SCR device is periodically compared with the NOx content downstream of the SCR device to ensure that conversion efficiency exceeds a predetermined minimum. The minimum conversion efficiency is selected according to requirements, and may for example lie in the range 10-40%; it is highly variable dependent upon the kind of engine and conditions of use, and the threshold will be determined by a skilled technician according to operational and design factors. Failure to meet this threshold typically illuminates a malfunction indicator light (MIL) on the vehicle dashboard, and logs a record in the usual electronic control unit (ECU) of the vehicle for later diagnosis by a repair technician.

Upstream NOx concentration may be calculated or may be sensed by a NOx sensor; downstream NOx is usually sensed by a separate NOx sensor.

A second OBD may be required to indicate the reason for failure of the SCR device. Two failure modes are generally possible, namely gross failure of the SCR device and incorrect fluid reductant. These failure modes cannot be distinguished by mere testing of NOx conversion efficiency.

In a prior art system NOx conversion efficiency is compared with a threshold for a test period immediately following a fluid reductant re-fill event. Such an event can be identified by a change in state of a level sensor in the supply tank. If NOx conversion efficiency is below the required threshold, the failure is determined to be low quality reductant rather than gross failure of the SCR. This result is logged electronically for a diagnostic technician, and may help to avoid misdiagnosis at a service centre. After the test period has passed, a failure to meet the threshold conversion efficiency may be assumed to be due to gross failure of the SCR, since the fluid reductant is considered to be of consistent quality until the next re-fill event.

It is apparent that the prior method can be defeated by regular topping-up of the fluid reductant if the amount of refill does not trip refill detection made by a level sensor. In such circumstances, topping up of the supply tank with e.g. water, will eventually cause NOx conversion efficiency to fall below the required threshold, but the failure will be logged as gross failure of the SCR rather than poor quality reductant, because no indication of re-fill has been detected. A particular circumstance where the existing method may fail is where the reductant supply tank has a separate header tank without level sensor, by reason of a confined space.

What is required is a means of differentiating a failure due to poor quality fluid reductant. Quality sensors have been proposed for fluid reductant, but are considered to be insufficiently accurate/too expensive at this time.

SUMMARY OF THE INVENTION

Aspects of the invention provide a method, a system, a module, an engine, a diagnostic, a prognostic and a vehicle as claimed in the appended claims.

In an embodiment of an aspect of the invention there is provided a method of monitoring the quality of a fluid reductant introduced into the exhaust stream of an internal combustion engine upstream of a Selective Catalyst Reduction (SCR) device, said method comprising: periodically determining the NOx conversion efficiency in the SCR device by comparing values of NOx in the exhaust gas stream both upstream and downstream of said device, maintaining a long term average value of said conversion efficiency, periodically determining a short term average value of conversion efficiency, and determining the difference between each new short term average value and the current long term average value.

The method may comprise declaring FAULT if said difference exceeds a first threshold, said long term average value exceeds a second threshold, and said short term average is below a third threshold. Alternatively the method may comprise declaring: PASS if said difference is below a first threshold; PASS if said difference exceeds said first threshold, said long term average value exceeds a second threshold, and said short term average value exceeds a third threshold; and FAULT if said difference exceeds said first threshold, said long term average value exceeds said second threshold, and said short term average is below said third threshold.

In an embodiment the method comprises recording a WARNING in a suitable memory location and/or declaring a WARNING if said difference exceeds a first threshold, said long term average value exceeds a second threshold, and said short term average exceeds a third threshold.

The method of embodiments of the invention can distinguish poor quality fluid reductant, that is to say a quality insufficient to maintain proper operation of the SCR device, from failure of the SCR device itself.

In an embodiment the engine is a diesel engine of a vehicle, and the fluid reductant is a Diesel Exhaust Fluid (DEF).

In some circumstances, a value or difference may be equal to a threshold rather than being above or below, and the method may provide for such equality to be determined equivalent to exceeding or to being below the relevant threshold in any suitable manner so as to ensure a PASS or FAULT result. Alternatively the method may determine such equality to be INDETERMINATE, and immediately repeat the method with a newly determined short term average value of conversion efficiency.

A particular advantage of embodiments of the invention is that when the difference between long term average value and the short term average value exceeds the first threshold, indicating that some additional PASS/FAULT test is required, other OBD routines may be inhibited until the OBD for quality of fluid reductant returns a result. Thus a different diagnostic, which might return a result indicating failure of the SCR device for another reason, can be temporarily inhibited pending an outcome of the method and diagnostic according to the invention. This permits the true reason for low NOx conversion efficiency to be determined, and indicated to a service or repair technician. Accordingly the method of the invention may have precedence over other test methods concerning operation of an SCR device.

Where a relevant threshold is closely approached, within a pre-determined tolerance band, the method may also determine INDETERMINATE, and immediately repeat the diagnostic until the average short term value of conversion efficiency is outside said tolerance band. Such a tolerance band will be selected by the skilled technician according to e.g. the specification of the test equipment, and conditions of use of the engine.

In one embodiment of a typical mid-life SCR device, having a supply tank just re-filled with reductant of unsuitable quality, the long term average value of conversion efficiency may be in the range 60-80%; a short term average value of conversion efficiency may be in the range 20-30%; the first threshold may be 35%, the second threshold may be 50% and the third threshold may be 22%. A tolerance band about such thresholds may be ±10%, or ±5% of the threshold.

It will be understood that these values are illustrative only, and will be in practice be selected by the skilled technician according to specifications and desirable outcomes. Thus a suitably qualified technician may set thresholds according to one or more of engine type, legislative limits and conditions of vehicle use. Such thresholds may be variable in use, but in most cases will comprise a factory setting.

It will be understood that the second threshold may comprise a minimum long term average NOx conversion efficiency, and if failing to meet the second threshold an SCR device may be considered to be at the end of its useful life, and an indication to the driver and to the diagnostic record may be entered.

The method may include the further step of indicating FAULT should the long term average value be below the second threshold.

It will be understood that the third threshold may comprise a value indicative of the minimum permissible quality fluid reductant, that is to say a quality sufficient to ensure a minimum allowable NOx conversion efficiency. Conventional SCR devices have a performance which deteriorates gradually over time, even if continually presented with an exhaust gas stream dosed with reductant of appropriate quality.

In an embodiment the method further comprises: monitoring the number of times the long term average value is reset to zero; and declaring FAULT if said number of times exceeds a predetermined threshold. The method may further comprise: monitoring the long term average value for a predetermined period of time after it has been reset to zero; and declaring FAULT if the long term average value does not exceed a predetermined threshold in said period of time.

This is advantageous to prevent abusive reset of the long term average value and to diagnose when initially there is water, or some other diluting agent, in the reductant supply tank.

In an embodiment of the invention said first threshold may be an absolute value, or may be a relative value determined according to said second threshold. Thus in one example the absolute value of the first threshold may be 50%, and such a value may be appropriate where the long term NOx conversion efficiency exceeds this absolute value. However as the conversion efficiency of the SCR device falls over time, due to inevitable deterioration, it can be envisaged that an absolute value of the first threshold may exceed the long term average value of NOx conversion efficiency. In such circumstances it may be appropriate to select a relative value of the first threshold such that, for example, a long term average value for NOx conversion efficiency of 70% may yield a value for the first threshold of half (50%) of that amount—35%.

Accordingly the method may include the step of using an absolute value for the first threshold until the second threshold reaches a predetermined value, and thereafter using a relative value for the first threshold.

A particular advantage of the method of an embodiment of the invention is that monitoring of reductant quality may be continual, and thus not rely upon triggering by a change of state of a level sensor. It will be thus understood that the level sensor may no longer be required in practice for the purpose of monitoring quality of the fluid reductant, which may represent a cost saving. In the alternative the use of a separate header tank for reductant supply tank, due to packaging constraints, is permissible since topping up of the header tank without triggering a level sensor in the supply tank, will not result in failure to detect a reductant of inappropriate quality. In this header tank arrangement, the provision of a second level sensor is also obviated.

In particular the risk of false attribution of the reason for apparent failure of an SCR device is mitigated, and a service technician may be prioritised to check the quality of the fluid reductant before investigating the SCR device itself; this may save both time and expense.

In order to check for very slow dilution of a fluid reductant, for example by weekly topping up of the supply tank, the method may comprise checking the rate of deterioration of the long and short term average NOx conversion efficiency. Slow dilution of this kind can be distinguished from very slow natural degradation of the SCR device, and if detected by reference to a dilution threshold, an appropriate message may be recorded in the OBD for later view by a service technician.

In yet another aspect the invention provides a system for monitoring a fluid reductant introduced into the exhaust stream of an internal combustion engine, comprising an exhaust system having an SCR device, devices for determining NOx content of an exhaust stream both upstream and downstream of said SCR device, a supply tank for introducing a fluid reductant into said exhaust stream upstream of said SCR device, and an OBD module configured to perform the method described above.

The system may have a header tank for said supply tank. The said devices for determining NOx content may comprise one or more NOx sensors. Said device for determining NOx content may further comprise a calculation module for providing an indicative NOx content upstream of said SCR device according to engine operating conditions.

The invention provides in a further aspect a vehicle incorporating such a system.

In a still further aspect the invention provides a diagnostic for implementing the method of the invention, said diagnostic having inputs indicative of NOx concentration both upstream and downstream of the SCR device. The diagnostic may be incorporated in a vehicle OBD module. The module may be responsive to electronic inputs indicative of NOx content, said OBD module including settable first, second and third thresholds.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

Other features of the invention will be apparent from the following description of an embodiment shown by way of example only in the accompanying drawings in which.

DETAILED DESCRIPTION

Figure 1:
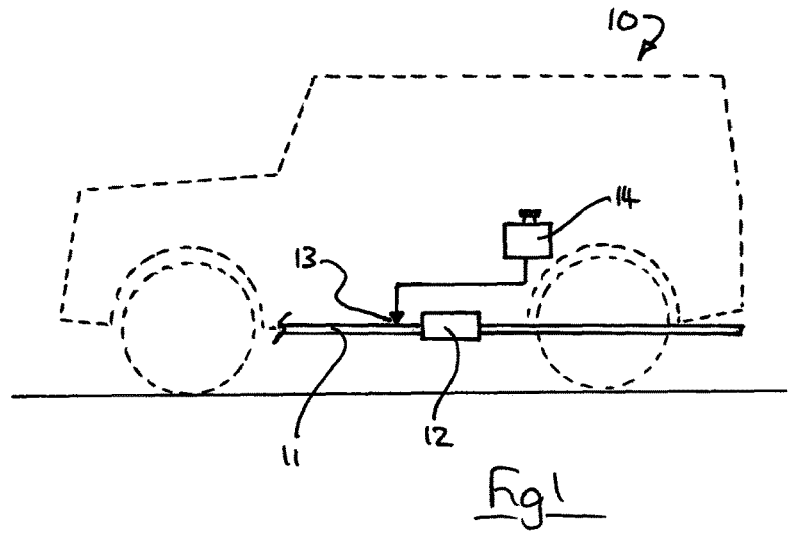
FIG. 1 is a schematic view of a motor vehicle for use with an embodiment of the invention.

FIG. 1 illustrates schematically a diesel engined vehicle 10 having an exhaust system 11 including a Selective Catalyst Reduction (SCR) device 12 of known kind. Upstream of the SCR device, a nozzle 13 admits a Diesel Exhaust Fluid (DEF), such as urea, from a supply tank 14. DEF is a fluid reductant specific to diesel engines. In use the DEF is mixed with the exhaust gas stream, and a chemical reaction occurs in the SCR device to convert NOx to nitrogen and water. This arrangement is well known and need not be further described here.

Operation of the SCR device is monitored by a conventional on-board diagnostic (OBD) of a vehicle electronic control system. Periodically the NOx content of the exhaust stream at the inlet to the SCR device is compared with the NOx content at the outlet, and the SCR device is considered faulty if a conversion of NOx is below a predetermined threshold. In this event the malfunction is indicated to the vehicle driver, and the fault is logged in the memory of the OBD system of the vehicle.

NOx content at the inlet may be calculated, according to engine operating conditions or may be sensed by a conventional NOx sensor. NOx content at the outlet is usually sensed by a NOx sensor. NOx conversion efficiency is typically represented by a signal learnt by an electronic control system of the vehicle, and is processed according to a diagnostic algorithm.

Figure 2:
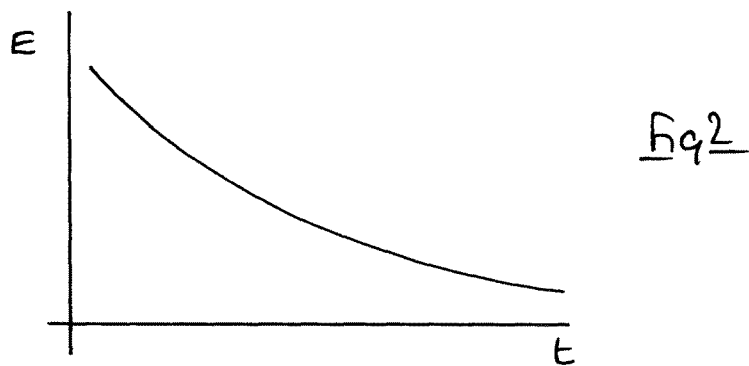
FIG. 2 is a graphical indication of long term NOx conversion efficiency of an SCR device.

FIG. 2 illustrates that the operational efficiency (E) of an SCR device falls over a long period (t) (e.g. 10 years), typically due to failure of the internal coating thereof and/or plugging by carbon particles and the like. The deterioration is gradual and progressive, and the maximum ability to convert NOx falls slowly over time.

Sudden failure of the SCR device may occur, for example due to impact damage, and be detected by the conventional diagnostic. The SCR device may also appear to have failed if an inappropriate DEF, such as water, is added to the tank 14. Legislation may require that the reason for failure of NOx conversion be identified by a diagnostic, and the present invention provides a solution to that requirement, utilizing the existing diagnostic apparatus.

Figure 3:
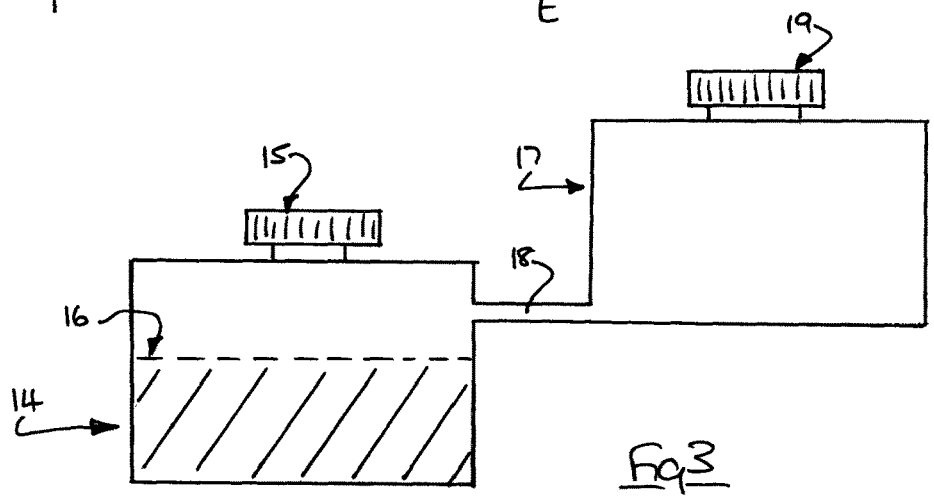
FIG. 3 shows schematically an arrangement of supply tank and header tank for fluid reductant.

FIG. 3 illustrates in detail a supply tank 14 for DEF, having a screw cap 15 to permit topping up. A level sensor of any suitable kind, such as a float valve or an ultrasonic transceiver, may detect when the level 16 of DEF falls below a pre-determined volume. Low level is indicated to the vehicle driver by, for example a dashboard message.

Where space in the vehicle is constrained, the supply tank may be insufficiently large, and accordingly a header tank 17 may be provided in another location, and connected by a conduit 18. The header tank includes a cap 19, in which case the cap 15 may be unnecessary. In practice the header tank 17 may be some distance from the supply tank 14, and located in a place convenient for topping up.

The invention avoids the necessity of a level sensor in the header tank 17, even if it is topped up regularly so that the level sensor of the supply tank is not activated. The invention also allows the removal of a level detector/sensor in the supply tank for the purposes of monitoring quality of the fluid reductant.

Figure 4:
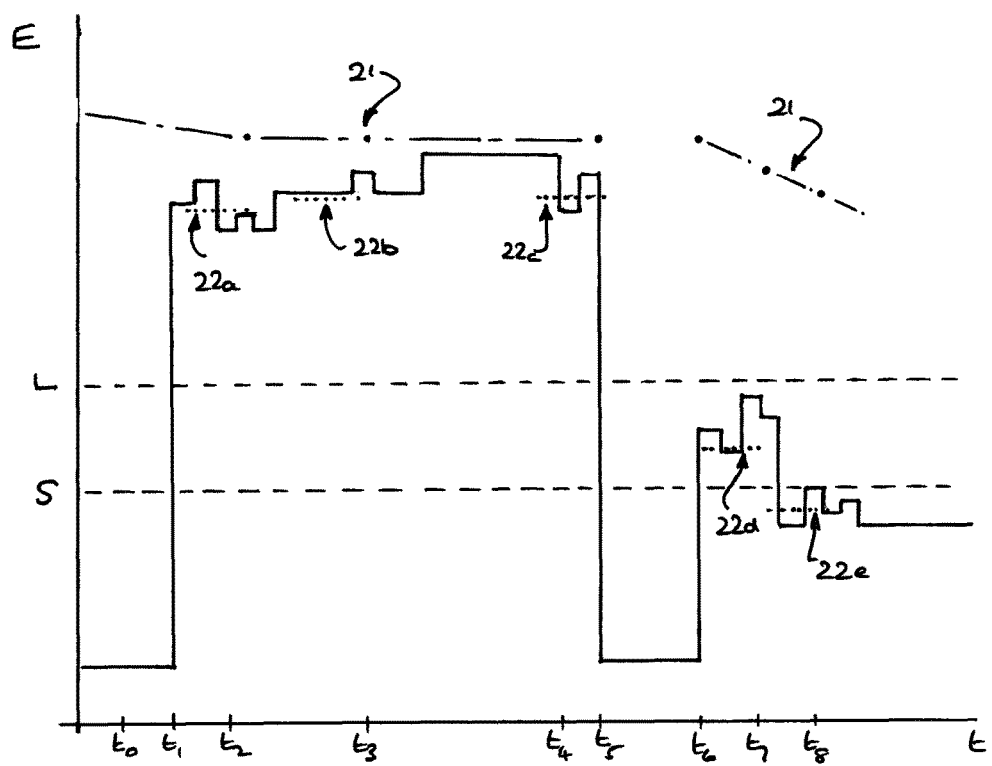
FIG. 4 is a graphical indication of the effect of an embodiment of the invention having regard to average values of NOx conversion efficiency.

FIG. 4 illustrates graphically NOx conversion efficiency (E) in a time period (t) sufficient to demonstrate an embodiment of the invention.

Periodically a diagnostic determines NOx conversion efficiency by comparing inlet and outlet NOx concentration at the SCR device. Small variations in the conversion efficiency signal are not unusual and accordingly successive values are summed to give a short term average (for example 5-6 successive values) and a long term average comprising all new short term average readings. The successive values are taken continually at a time appropriate to assess NOx conversion efficiency, which may for example be in substantially steady state operating conditions of the engine. The successive values may be taken at an appropriate small time interval—for example every 1-10 minutes—under such conditions.

The long term average will gradually fall over time to reflect deterioration of the SCR device, as represented by the chain-dot trace (21).

The short term average will vary more widely, as represented by dotted traces (22).

With reference to FIG. 4, at time $t_0$ the NOx conversion diagnostic is not running, for example because the engine is stopped, or conditions for monitoring are not met. The long term average conversion efficiency at time $t_0$ is retained in a memory device of a diagnostic processor, or may have a default value. A default value may be e.g. 80%, but will be quickly modified towards an accurate long term conversion efficiency as successive short term values are determined and added to the long term average.

At time t1, the operation of the diagnostic commences. Successive determinations of NOx conversion efficiency are averaged to give a short term average at time $t_2$. In addition these determinations are also added to the long term average.

As illustrated at $t_0$, the long term average is 70%. At time $t_2$, the short term average 22a is 62%, and the long term average 68%.

At time $t_3$ a second short term average 22b is 63%, and the long term average is unaffected at 68%.

The interval between $t_2$ and $t_3$ may be set according to a time. A time interval of for example 30 minutes may be appropriate, but in general the time interval will vary with the ability of the system to safely and robustly give a true indication of NOx conversion efficiency. Conditions of use of a vehicle, for example spirited driving, may cause the diagnostic to be suspended until it is considered appropriate to resume operation thereof. A suitable control system, not part of the present invention, will determine when it is appropriate to perform the diagnostic of the invention.

At time $t_4$, a third short term average 22c is 63% and the long term average is 68%.

At time $t_5$ the calculation of NOx conversion efficiency ceases, for example because the engine is switched off. The current short term average is not retained, but the long term average may be retained in a memory of the diagnostic processor, as noted above.

During the period $t_1$-$t_5$, the long term average is compared with a minimum threshold (L) of NOx conversion efficiency (for example 30%). In addition the short term average is compared with a lower threshold (S) which represents a quality threshold for DEF (for example 22%). This quality threshold is selected or set according to legislative limits, typically representing acceptable tailpipe emissions.

At $t_6$ the calculation of NOx conversion efficiency is re-started, but with a DEF of reduced quality, for example due to a re-fill of the supply tanks 14 with water. NOx conversion efficiency is inevitably reduced due to dilution of the residual DEF.

At $t_7$ a new short term average 22d of 25% is determined. The retained long term average of 68% falls to 65%.

At $t_8$ the short term average 22e falls to 20%, and the long term average to 61%. It will be observed that at $t_8$ the short term average is below that representative of poor quality DEF. The diagnostic of the invention distinguishes between gross failure of the SCR device and poor quality DEF in the following manner.

Two modes of diagnostic operation are possible.

In a first mode, the diagnostic determines the absolute difference between the long term average and the short term average. If the difference is less than a defined difference threshold, the SCR device is considered functional. Thus, for example, at $t_2$ the difference is 6%, but the difference threshold may be 40%. In this example the diagnostic is satisfied and declares PASS or FAST PASS.

If however the difference is greater than the difference threshold, the diagnostic assumes a fault may be present, and further steps are taken. Thus at both $t_7$ and $t_8$ the difference threshold is not satisfied, and the diagnostic now determines if the short term average is below the threshold (S) whilst the long term average remains above the minimum conversion threshold (L).

At $t_7$ the short term average is above the quality threshold (S), and PASS is declared. At $t_8$ the short term average is below the quality threshold (S), and FAULT is declared.

In the first mode of operation, the difference threshold is an absolute value. In the second mode of operation, the difference threshold is a relative value, and a proportion of the long term average (L). In this second mode, the diagnostic can reflect the inevitable reduction in performance of the SCR device due to ageing. Accordingly the diagnostic may be operated in the first mode when the SCR device is new, and switch to the second mode when the SCR device has reached, or is assumed to have reached a certain reduced maximum NOx conversion efficiency.

As noted above, regular topping up of DEF may not activate a level sensor in the supply tank. In certain circumstances, where topping up is also by regular small amounts, the dilution of the fluid reductant (DEF) may be very slow. In these circumstances both the long term average of NOx conversion, and the short term average of NOx conversion will degrade over time at a rate that may not create the necessary difference between them. However it can be shown that such degradation will be much faster than the rate of natural deterioration of the SCR device itself (due for example to deterioration of the catalyst coating) so that these phenomena can be easily distinguished.

Figure 5:
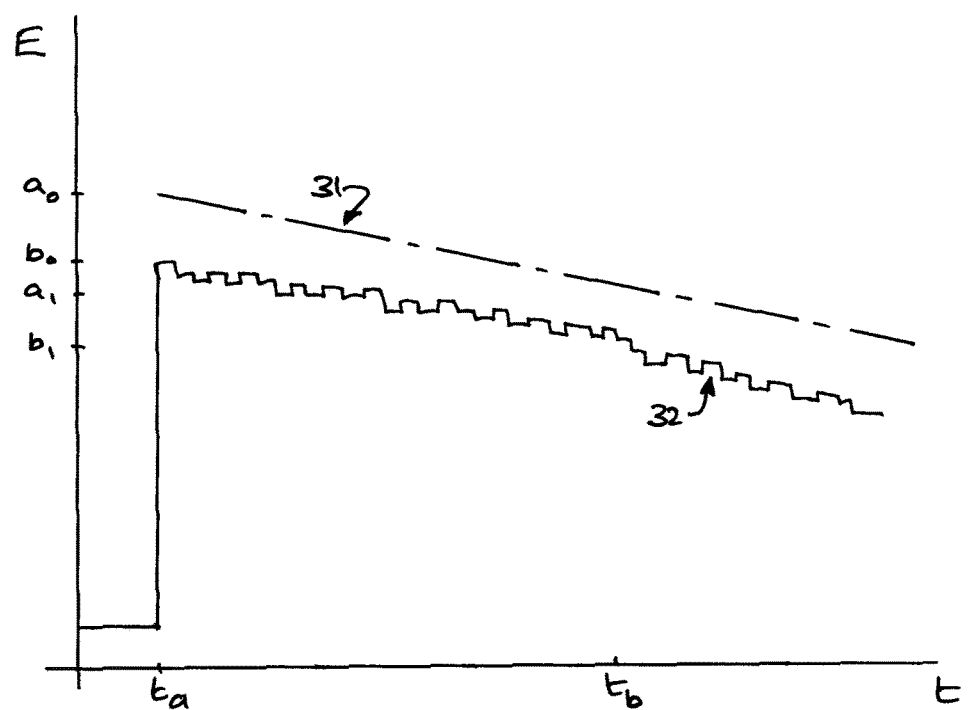
FIG. 5 is a graphical indication of slow degradation of NOx conversion due to slow dilution of a fluid reductant.

An aspect of the invention may provide for tracking a rate of change of long term and short term average over a relatively short time scale, and repeat such tracking periodically. With reference to FIG. 5 tracking may occur over a time period from $t_a$ to $t_b$, and comprise for example 200 successive updates of short term average.

Thus the long term average at time $t_a$ may be compared with the long term average at time $t_b$, and compared with a pre-determined dilution threshold. The short term average may be compared in the same manner over the same time period.

The dilution threshold for this test is set according to empirical testing, to clearly distinguish slow dilution of the reductant from natural deterioration of the SCR device, and the dilution threshold for the long term average may be different to that for the short term average.

In the event that the dilution threshold is exceeded, thus indicating degradation of NOx conversion efficiency at a rate greater than natural deterioration of the SCR device, it may be declared by the OBD that slow dilution of the fluid reductant is occurring notwithstanding that the necessary difference between the long and short term averages has not reached the difference threshold.

FIG. 5 illustrates this phenomenon, in which NOx conversion efficiency is plotted against time. Traces of long term average conversion efficiency 31 and short term conversion efficiency 32 are shown.

At time $t_a$, the long and short term NOx conversion efficiencies are respectively $a_0$ and $b_0$.

At time $t_b$, the long and short term NOx conversion efficiencies are respectively $a_1$ and $b_1$.

The OBD tests for the difference $a_0-a_1$, being higher than a set dilution threshold, and/or for the differences $a_0-a_1$ and $b_0-b_1$ being higher than set dilution thresholds to indicate possible slow dilution of the fluid reductant. In consequence a suitable diagnostic message may be recorded in the OBD memory for a service technician to indicate that the quality of the fluid reductant should be checked first.

An aspect of the invention may provide for a prognostic where the long term average is above the second threshold, the short term average is above the third threshold and the difference exceeds the first threshold. In this instance, no indication (such as FAULT) may be made immediately to the vehicle user or driver as the system has not 'failed' any of the critical thresholds related to legislation or quality, such as the second or third thresholds. However a sudden deterioration in DEF quality is potentially indicated and a record of this can be kept in a suitable memory storage system, such as a vehicle ECU, for later reference, for example by a technician or engineer during servicing or maintenance, whereupon a quality check of the fluid in the DEF tank(s) can be undertaken. Where appropriate, a suitable diagnostic message may be recorded in the OBD memory. If necessary, corrective measures can then be taken before the reduced DEF quality becomes a problem. In an alternative embodiment, the system may declare a FAULT or WARNING or make a similar or other such declaration in this circumstance.

There is no predetermined long or short term averages stored in the powertrain control module (OBD module) before the vehicle is driven. The invention relies on learnt values (a short term average and a long term average of the SCR conversion efficiency) which are carried over from one drive cycle to another drive cycle by being stored before the powertrain control module is powered down and restored when it is powered on. These values may be locally erased (reset to zero) by a manufacturer extended service routine or other means. Repeated resetting of these values will result in steady reduction of NOx conversion rates, or slow dilution of the reductant, going undetected. In order to prevent abusive reset of these values, an aspect of the invention includes tampering monitoring where the number of resets of the long term average value is monitored. If the number of resets exceeds an allowed predetermined threshold within a given predetermined engine run time (for example, 40 hours) or vehicle distance, or amount of urea drawn into the SCR catalyst, the system may declare a FAULT. If the values continue to be reset then the vehicle may be immobilised after a predetermined distance (for example 800 km).

As mentioned above, the invention relies on the self-learning of a long term average of the SCR conversion efficiency. According to an aspect of the invention, if at first fill of reductant the long term average is not above a predetermined threshold value, then it may become impossible to diagnose an incorrect reagent. Therefore, after the values have been reset, it is expected that the long term conversion efficiency exceeds the predetermined threshold value, otherwise it may be concluded that there is already water, or some other diluting agent, in the header tank. If the long term average value does not exceed the predetermined threshold within a predetermined period of time then a FAULT may be declared.

The foregoing description relates to the use of DEF in a diesel engined vehicle. However it will be appreciated that the invention is applicable to the treatment of NOx in the exhaust of any kind of internal combustion engine using a fluid reductant as catalyst, and in non-vehicle applications.

Certain aspects of the invention are stated in the numbered paragraphs that follow:

1. A method of monitoring the quality of a fluid reductant introduced into the exhaust stream of an internal combustion engine upstream of a Selective Catalyst Reduction (SCR) device, said method comprising:
   periodically determining the NOx conversion efficiency in the SCR device by comparing values of NOx in the exhaust gas stream both upstream and downstream of said device,
   maintaining a long term average value of said conversion efficiency,
   periodically determining a short term average value of conversion efficiency,
   determining the difference between each new short term average value and the current long term average value.

2. A method according to aspect 1 comprising declaring:
   FAULT if said difference exceeds a first threshold, said long term average value exceeds a second threshold, and said short term average is below a third threshold.

3. A method according to aspect 1 comprising declaring:
   PASS if said difference is below a first threshold;
   PASS if said difference exceeds said first threshold, said long term average value exceeds a second threshold, and said short term average value exceeds a third threshold; and
   FAULT if said difference exceeds said first threshold, said long term average value exceeds said second threshold, and said short term average is below said third threshold.

4. A method according to aspect 1 comprising recording a WARNING in a suitable memory location and/or declaring a WARNING if said difference exceeds a first threshold, said long term average value exceeds a second threshold, and said short term average exceeds a third threshold.

5. A method according to aspect 1 further comprising:
   monitoring the number of times the long term average value is reset to zero; and
   declaring FAULT if said number of times exceeds a predetermined threshold.

6. A method according to aspect 5 further comprising:
   monitoring the long term average value for a predetermined period of time after it has been reset to zero; and
   declaring FAULT if the long term average value does not exceed a predetermined threshold in said period of time.

7. A method according to aspect 1 wherein said difference comprises a pre-determined absolute amount.

8. A method according to aspect 1 wherein said difference comprises a proportion of the current long term average value.

9. A method according to aspect 1 wherein said difference comprises initially an absolute value and subsequently a proportion of the current long term average value.

10. A method according to aspect 1 wherein said short term average value comprises a continuous sequence of determinations of NOx conversion efficiency.

11. A method according to aspect 10 wherein said sequence comprises between 3 and 20 determinations.

12. A method according to aspect 1 wherein determination of NOx conversion efficiency is periodic, and selected according to an engine operating condition comprising one or more of engine revolutions, volumetric exhaust gas flow, and exhaust gas temperature.

13. A method according to aspect 1 and comprising calculating the value of NOx upstream of the SCR device according to operating parameters of the diesel engine.

14. A method according to aspect 1 applied to a diesel engined vehicle having a Diesel Exhaust fluid as fluid reductant.

15. A system for monitoring a fluid reductant introduced into the exhaust stream of an internal combustion engine, and comprising an SCR device for the exhaust of an internal combustion engine, devices for determining NOx content of an exhaust stream both upstream and downstream of said SCR device, a supply tank for introducing a fluid reductant into said exhaust stream upstream of said SCR device, and an OBD module configured to perform the method of aspect 1.

16. A system according to aspect 15, and having a header tank for said supply tank.

17. A system according to aspect 15 wherein said devices for determining NOx content comprise one or more NOx sensors.

18. A system according to aspect 15 wherein said device for determining NOx content comprise a calculation module for providing an indicative NOx content upstream of said SCR device according to engine operating conditions.

19. An OBD module for an electronic diagnostic system, said OBD module configured to implement the method of aspect 1.

20. An OBD module according to aspect 19 and responsive to electronic inputs indicative of NOx content, said OBD module including settable first, second and third thresholds.

21. An internal combustion engine including an OBD module for implementing the method of aspect 1.

22. An internal combustion engine according to aspect 21, wherein said internal combustion engine is a diesel engine.

23. A vehicle incorporating the internal combustion engine of aspect 21.

24. A vehicle incorporating the system of aspect 15.

The invention claimed is:

1. A method of monitoring a fluid reductant introduced into an exhaust gas stream of an internal combustion engine having a Selective Catalyst Reduction (SCR) device, the method comprising:
periodically determining a NOx conversion efficiency in the SCR device by comparing values of NOx in the exhaust gas stream both upstream and downstream of the SCR device;
determining a long term average value of the NOx conversion efficiency;
periodically determining a short term average value of the NOx conversion efficiency;
determining a difference between a new short term average value and the long term average value; and
outputting a signal indicating FAULT if the difference between the new short term average value and the long term average value exceeds a first threshold, the long term average value exceeds a second threshold, and the new short term average value is below a third threshold.

2. The method of claim 1, further comprising outputting a signal indicating:
PASS if the difference between the new short term average value and the long term average value is below the first threshold; and
PASS if the difference between the new short term average value and the long term average value exceeds the first threshold, the long term average value exceeds the second threshold, and the new short term average value exceeds the third threshold.

3. The method of claim 1, further comprising recording a WARNING in a suitable memory location and/or outputting a signal indicating a WARNING if the difference between the new short term average value and the long term average value exceeds the first threshold, the long term average value exceeds the second threshold, and the new short term average exceeds the third threshold.

4. The method of claim 1, wherein the first threshold comprises one or more of a group comprising a pre-determined absolute amount, a proportion of the current long term average value, and initially an absolute value and subsequently a proportion of the current long term average value.

5. The method of claim 1, wherein periodically determining the NOx conversion efficiency is selected according to an engine operating condition comprising one or more of engine revolutions, volumetric exhaust gas flow, and exhaust gas temperature.

6. The method of claim 1, wherein the internal combustion engine is a diesel engine, and further comprising calculating a value of NOx upstream of the SCR device according to operating parameters of the diesel engine.

7. The method of claim 1, wherein the internal combustion engine is a diesel engine having a diesel exhaust fluid as fluid reductant.

8. The method of claim 1, further comprising:
monitoring a number of times the long term average value is reset to zero; and
outputting a signal indicating FAULT if the number of times exceeds a predetermined threshold.

9. The method of claim 8, further comprising:
monitoring the long term average value for a predetermined period of time after it has been reset to zero; and
outputting a signal indicating FAULT if the long term average value does not exceed a predetermined threshold in the predetermined period of time.

10. The method of claim 1, wherein the short term average value comprises a continuous sequence of determinations of NOx conversion efficiency.

11. The method of claim 10, wherein the sequence comprises between 3 and 20 determinations of NOx conversion efficiency.

12. A system for monitoring a fluid reductant introduced into an exhaust gas stream of an internal combustion engine, the system comprising:
a Selective Catalyst Reduction (SCR) device for the exhaust gas of the internal combustion engine;
a device for determining NOx content of the exhaust gas stream upstream of the SCR device and a device for determining NOx content of the exhaust gas stream downstream of the SCR device;
a supply tank configured to introduce the fluid reductant into the exhaust gas stream upstream of the SCR device; and
an On-board Diagnostic (OBD) module configured to perform the method of claim 1.

13. The system of claim 12, further comprising a header tank for the supply tank.

14. The system of claim 12, wherein the devices for determining NOx content comprise one or more NOx sensors.

15. The system of claim 12, wherein the device for determining NOx content of the exhaust gas stream upstream of the SCR device comprises a calculation module for providing an indicative NOx content upstream of the SCR device according to engine operating conditions.

16. A vehicle incorporating the system of claim 12.

17. An On-board Diagnostic (OBD) module for an electronic diagnostic system, the OBD module configured to implement the method of claim 1.

18. The OBD module of claim 17, wherein the OBD module is responsive to electronic inputs indicative of NOx content, and wherein the OBD module comprises settable first, second and third thresholds.

19. An internal combustion engine including the OBD module of 17.

20. A vehicle incorporating the internal combustion engine of claim 19.

* * * * *